(12) United States Patent
Stjernberg et al.

(10) Patent No.: US 12,529,345 B2
(45) Date of Patent: Jan. 20, 2026

(54) SYSTEM AND METHOD FOR CONTROLLING A FUEL SUPPLY SYSTEM

(71) Applicant: VOLVO TRUCK CORPORATION, Gothenburg (SE)

(72) Inventors: Oscar Stjernberg, Gothenburg (SE); Martin Wilhelmsson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/921,207

(22) Filed: Oct. 21, 2024

(65) Prior Publication Data

US 2025/0137411 A1 May 1, 2025

(30) Foreign Application Priority Data

Oct. 26, 2023 (EP) ..................................... 23206178

(51) Int. Cl.
*F02D 19/06* (2006.01)
*F02D 19/08* (2006.01)
*F02M 31/04* (2006.01)

(52) U.S. Cl.
CPC ..... *F02D 19/0649* (2013.01); *F02D 19/0647* (2013.01); *F02D 19/0665* (2013.01); *F02D 19/0678* (2013.01); *F02D 19/08* (2013.01); *F02M 31/045* (2013.01)

(58) Field of Classification Search
CPC ............. F02D 19/0649; F02D 19/0647; F02D 19/0665; F02D 19/0678; F02D 19/05; F02M 31/045
See application file for complete search history.

(56) References Cited

U.S. PATENT DOCUMENTS

| | | | |
|---|---|---|---|
| 5,809,999 A * | 9/1998 | Lang | A62B 7/14 128/201.24 |
| 9,644,551 B2 | 5/2017 | Marscheider et al. | |
| 10,358,148 B2 | 7/2019 | Foege et al. | |
| 10,669,954 B2 | 6/2020 | King et al. | |

(Continued)

FOREIGN PATENT DOCUMENTS

FR 2829745 A1 * 3/2003 ......... A62C 99/0018

OTHER PUBLICATIONS

European Search Report for European Patent Application No. 23206178.8, dated Apr. 2, 2024, 8 pages.

*Primary Examiner* — Kevin A Lathers
(74) *Attorney, Agent, or Firm* — Sage Patent Group

(57) ABSTRACT

A system for handling surplus methane in a fuel supply system for an internal combustion engine (ICE) system, the system comprising: an inert gas supply system configured to be in fluid communication with the fuel supply system and further configured to supply inert gas to an inert gas supply conduit position of the fuel supply system; a burner configured to be in fluid communication with the fuel supply system via a controllable valve device, the controllable valve device being disposed downstream the fuel supply conduit position; and a controller comprising processing circuitry configured to: predict an upcoming ICE non-operational time period; in response to the predicted ICE non-operational time period, determine to inject inert gas to the inert gas supply conduit position so as to flush the fuel supply system; and control the controllable valve device to direct any flushed-out methane to the burner.

15 Claims, 4 Drawing Sheets

(56) References Cited

U.S. PATENT DOCUMENTS

| | | |
|---|---|---|
| 2014/0316677 A1 | 10/2014 | Stockner et al. |
| 2019/0048820 A1 | 2/2019 | Willis et al. |
| 2022/0194622 A1* | 6/2022 | Rambo ................ B64D 37/34 |
| 2023/0123561 A1 | 4/2023 | Fisher et al. |
| 2023/0193840 A1 | 6/2023 | Dillen et al. |
| 2023/0227166 A1* | 7/2023 | Pal ........................ B64D 13/06 62/79 |

* cited by examiner

SYSTEM AND METHOD FOR CONTROLLING A FUEL SUPPLY SYSTEM

CROSS REFERENCE TO RELATED APPLICATION

This application claims foreign priority to European Patent Application No. 23206178.8 filed on Oct. 26, 2023, the disclosure and content of which is incorporated by reference herein in its entirety.

TECHNICAL FIELD

The disclosure relates generally to the field of internal combustion engines and, more specifically, to fuel supply systems for internal combustion engines powered by alternative fuels, such as Liquefied Natural Gas (LNG) and Compressed Natural Gas (CNG). In particular aspects, the disclosure relates to a system and a method for handling surplus methane in a fuel supply system for an internal combustion engine (ICE) system of a vehicle. The disclosure can be applied to heavy-duty vehicles, such as trucks, buses, and construction equipment, among other vehicle types. The disclosure may also be applied in other ICE systems for other vehicles, such as cars and marine vehicles, as well as in industrial ICE systems. Although the disclosure may be described with respect to a particular vehicle, the disclosure is not restricted to any particular vehicle.

BACKGROUND

The utilization of natural gas, including both LNG and CNG, as a clean and sustainable fuel source for internal combustion engines is one of many examples considered in the heavy-duty vehicle industry. Natural gas is recognized for its reduced carbon emissions, improved air quality, and cost-efficiency compared to conventional gasoline or diesel fuels.

However, the developments of fuel supply systems for internal combustion engines operating on natural gas have generally focused on methods for utilizing fuel storage tanks and delivering the natural gas to the engine in an efficient manner. However, there are several additional challenges associated with these fuel supply systems. Both LNG and CNG are composed of methane (CH4), which is a hydrocarbon gas. As methane is a potent greenhouse gas, it would be desirable to further develop the ICE system to reduce, or at least better eliminate methane emissions.

SUMMARY

According to a first aspect of the disclosure, there is provided a system for handling surplus methane in a fuel supply system for an internal combustion engine (ICE) system. The system comprises an inert gas supply system configured to be in fluid communication with the fuel supply system and further configured to supply inert gas to an inert gas supply conduit position of the fuel supply system; and a burner configured to be in fluid communication with the fuel supply system via a controllable valve device. The controllable valve device is disposed downstream the inert gas supply conduit position. The system further comprises a controller comprising processing circuitry configured to: predict an upcoming ICE non-operational time period; in response to the predicted ICE non-operational time period, determine to inject inert gas to the inert gas supply conduit position so as to flush the fuel supply system; and control the controllable valve device to direct any flushed-out methane to the burner, allowing the methane to be mixed with ambient air and burned into residuals.

The first aspect of the disclosure may seek to reduce the amount of methane being emitted to the environment by flushing the fuel supply system connecting the fuel tank to the ICE with inert gas. A technical benefit may include to provide a more efficient fuel supply system for an ICE operating on LNG and CNG, in which trapped methane can be more safely taken care of by burning-off the methane trapped on the fuel side of the ICE. By burning the methane, it becomes possible to reduce methane leakage to the environment, thus reducing its impact on the environment (and on climate change). When methane is burned, residuals are primarily produced in form of carbon dioxide (CO2) and water vapor, with fewer harmful air pollutants in comparison with other fossil gases. CO2 still is a greenhouse gas but much less potent than methane. In order to empty the fuel supply system from trapped surplus methane, the fuel supply system is flushed with inert gas as described herein.

In the context of the disclosure, the term "residuals" generally refers to Carbon Dioxide (CO2) and water (H2O), more specifically water vapor. The combustion of methane (CH4) may also produce several other combustion products and residuals, which can vary depending on the combustion conditions and the presence of impurities.

The upcoming ICE non-operational time period may generally refer to a time period where the ICE is in a non-combustible state, i.e. a state in which the ICE is not combusting any fuel (LNG or CNG). In this state, there may be a potential risk of having surplus methane in the fuel supply system. The non-combustible state may generally comprise an inactive state of the ICE including, but not restricted to, a non-load state, an ICE shutdown state (where the ICE is turned off), a piston non-rotational state of the ICE and the like. In one example, the ICE non-operational time period is the ICE shut-down time period. As such, the processing circuitry is configured to predict an upcoming ICE shut-down time period.

Optionally, in some examples, including in at least one preferred example, the system may be configured to be activated in response to a change in an operational mode of the ICE. A technical benefit may include to provide an even more precise operation of the system so that the flush-out of the surplus methane can be performed without a delay when there is a change from one operational state to another operational state.

Optionally, in some examples, including in at least one preferred example, the fuel supply system may comprise one or more fuel tanks configured to store and supply fuel to the ICE. A technical benefit may include to improve the storage capabilities of the fuel supply system.

Optionally, in some examples, including in at least one preferred example, the fuel supply system may be a liquid natural gas (LNG) fuel supply system or a compressed natural gas (CNG) fuel supply system.

Optionally, in some examples, including in at least one preferred example, the inert gas supply conduit position fluidly connecting the inert gas supply system to the fuel supply system may be located in-between the one or more fuel tanks and the controllable valve device. A technical benefit may include to further facilitate the process of flushing out the surplus methane from the fuel supply system.

Optionally, in some examples, including in at least one preferred example, the inert gas supply system may comprise a tank for storing inert gas. A technical benefit may include to improve the storage capabilities of inert gas in the inert gas supply system.

Optionally, in some examples, including in at least one preferred example, the controller may be further configured to compare the predicted ICE non-operational time period with a threshold value, and determine to inject inert gas to the inert gas supply conduit position so as to flush the fuel supply system if the predicted ICE non-operational time period exceeds the threshold value. A technical benefit may include to improve the precision of deciding when to inject inert gas into the fuel supply system. In addition, the use of a threshold value further allows for providing an improved controllable system as well as allowing for improved prediction of when to inject inert gas into the fuel supply system.

Optionally, in some examples, including in at least one preferred example, the threshold value may be any one of a static threshold value and a dynamic threshold value. A technical benefit with a dynamic threshold may include to improve the adaptability of the control of the system. A technical benefit with a static threshold may include a less complex implementation of the controller in the system.

Optionally, in some examples, including in at least one preferred example, the dynamic threshold value may be defined by a driver behavior prediction model configured to collect data of any one of previous driver behavior and previous usage of the vehicle. A technical benefit may include to further improve the predictability of the system as well as the accuracy of the system in terms of providing a more precis prediction of the operation of the vehicle.

Optionally, in some examples, including in at least one preferred example, the system further may comprise a sensor device to monitor a pressure of the inert gas stored in the inert gas supply system so as to detect any leakage of the inert gas supply system. A technical benefit may include to improve the reliability of the system as well as to provide an improved leakage handling system of any inert gas.

Optionally, in some examples, including in at least one preferred example, the ICE non-operational time period may be an ICE shut-down time period.

According to a second aspect of the disclosure, there is provided a vehicle comprising a system of the first aspect.

According to a third aspect of the disclosure, there is provided a computer-implemented method for handling surplus methane in a fuel supply system for an internal combustion engine (ICE) system. The system comprises an inert gas supply system configured to be in fluid communication with the fuel supply system and further configured to supply inert gas to an inert gas supply conduit position of the fuel supply system; and a burner configured to be in fluid communication with the fuel supply system via a controllable valve device. The controllable valve device is disposed downstream the inert gas supply conduit position. The computer-implemented method is implemented by a processing circuitry. The method comprises predicting, by processing circuitry, an upcoming ICE non-operational time period; in response to the predicted ICE non-operational time period, determining, by processing circuitry, to inject inert gas to the inert gas supply conduit position so as to flush the fuel supply system; and controlling, by processing circuitry, the controllable valve device to direct any flushed-out methane to the burner, allowing the methane to be mixed with ambient air and burned into residuals.

The third aspect of the disclosure may seek to reduce the amount of methane being emitted to the environment by flushing the fuel supply system connecting the fuel tank to the ICE with inert gas. A technical benefit may include to provide a more efficient fuel supply system for an ICE operating on LNG and CNG, in which trapped methane can be more safely taken care of by burning-off the methane trapped on the fuel side of the ICE. By burning the methane, it becomes possible to reduce methane leakage to the environment, thus reducing its impact on the environment (and on climate change). When methane is burned, residuals are primarily produced in form of carbon dioxide ($CO_2$) and water vapor, with fewer harmful air pollutants in comparison with other fossil gases. $CO_2$ still is a greenhouse gas but much less potent than methane. In order to empty the fuel supply system from trapped surplus methane, the fuel supply system is flushed with inert gas as described herein.

According to a fourth aspect of the disclosure, there is provided a computer program product comprising program code for performing, when executed by the processing circuitry of the first aspect, the method of the third aspect.

According to a fifth aspect of the disclosure, there is provided a non-transitory computer-readable storage medium comprising instructions, which when executed by the processing circuitry of the first aspect, cause the processing circuitry to perform the method of the third aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1:
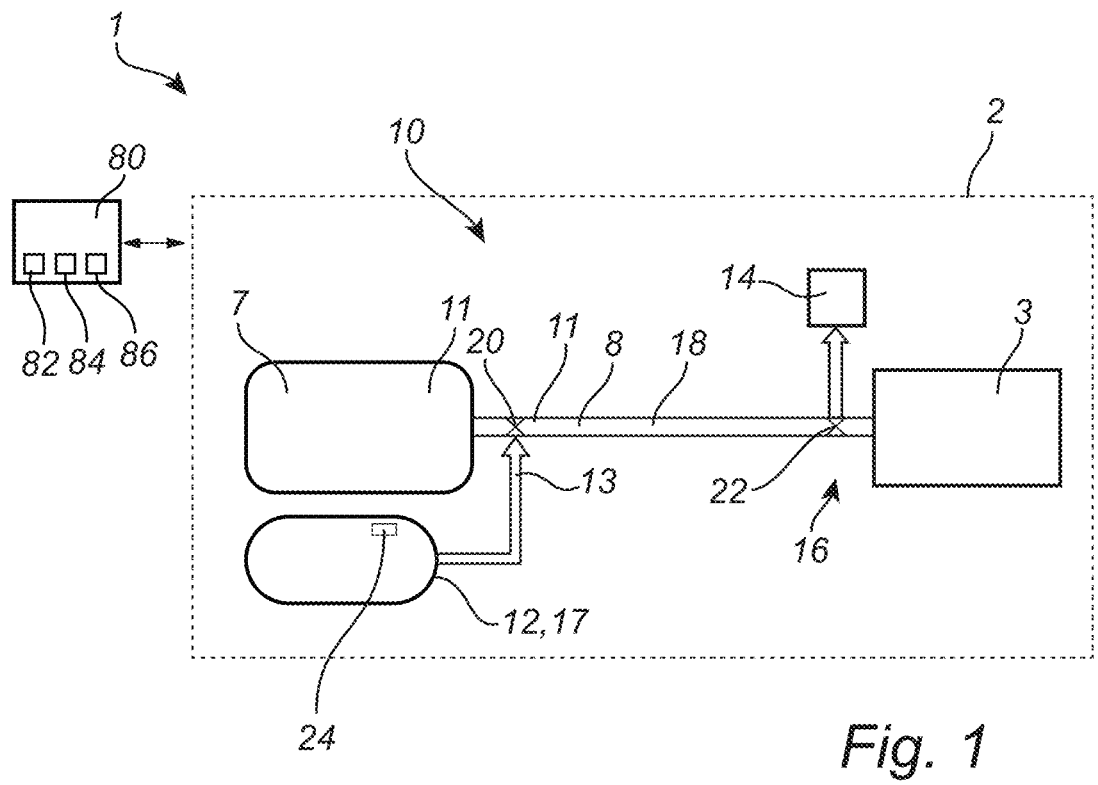
FIG. 1 illustrates an exemplary view of a system for handling surplus methane in a fuel supply system of a vehicle according to an example.

The detailed description set forth below provides information and examples of the disclosed technology with sufficient detail to enable those skilled in the art to practice the disclosure.

An internal combustion engine (ICE) operating on Liquefied Natural Gas (LNG) or Compressed Natural Gas (CNG) is one example of a power source that may be an attractive alternative to traditional gasoline or diesel-powered engines. LNG and CNG produce fewer harmful emissions compared to gasoline and diesel. LNG and CNG may generally result in lower carbon dioxide ($CO_2$), nitrogen oxides (NOx), sulfur dioxide ($SO_2$), and particulate matter emissions. Moreover, the ICE operating on LNG or CNG may reduce greenhouse gas emissions since natural gas emits fewer greenhouse gases, such as $CO_2$ and methane ($CH_4$), compared to other fossil fuels. In other words, LNG and CNG are composed by methane.

For an ICE system of a heavy-duty vehicle, such as a truck, the methane is generally compressed on the fuel side of the ICE prior to be injected into the cylinder(s) of the ICE for combustion.

More specifically, during normal operation of the ICE, the methane is directed from the fuel tank(s) of the vehicle to the ICE through one or more fuel conduits. These fuel conduits are e.g. formed by a network of pipes and hoses. The supply of methane from the fuel tanks to the ICE is relatively easy to control during operation of the ICE. However, in other situations, e.g. when the ICE is in an inactive state, e.g. when the vehicle is not being used, it has been observed that there is often a surplus of pressurized methane trapped in the fuel conduits connecting the fuel tank(s) with the ICE. At this state of the vehicle, there is thus a risk of natural gas leakage from the fuel supply system. The risk of leakage can occur at several different locations, e.g. at system and component connection points, at, or in, the valves and/or from damaged tubes/pipes of the fuel supply system. By way of example, the system may have a tube with a micro leak. The pressure of the system will generally not drop so quickly as a consequence of a micro leak, it can thus be hard to identify such a leak with sensors.

For these and other reasons, there is still a need for improving ICE systems operating on LNG or CNG during their non-operational states. In particular, there is a need for improving the fuel supply system of the ICE system.

To remedy this, the present disclosure provides systems and methods for handling methane in the fuel supply system in a more efficient and safe manner, as compared to current prior art systems.

The disclosure may seek to reduce the amount of methane being emitted to the environment by flushing the fuel supply system connecting the fuel tank to the ICE with inert gas. A technical benefit may include to provide a more efficient fuel supply system for an ICE operating on LNG and CNG, in which trapped methane can be more safely taken care of by burning-off the methane trapped on the fuel side of the ICE. By burning the methane, it becomes possible to reduce methane leakage to the environment, thus reducing its impact on the environment (and on climate change). When methane is burned, residuals are primarily produced in form of carbon dioxide ($CO_2$) and water vapor, with fewer harmful air pollutants in comparison with other fossil gases. $CO_2$ still is a greenhouse gas but much less potent than methane. In order to empty the fuel supply system from trapped surplus methane, the fuel supply system is flushed with inert gas as described herein.

In the context of the disclosure, the term "residuals" generally refers to Carbon Dioxide ($CO_2$) and water ($H_2O$), more specifically water vapor. The combustion of methane ($CH_4$) may also produce several other combustion products and residuals, which can vary depending on the combustion conditions and the presence of impurities.

The vehicle may be any type of vehicle suitable for transporting goods and/or people, such as bulk material from one location to another. For example, the vehicle may be an excavator, loader, articulated hauler, dump truck, truck or any other suitable vehicle known in the art. In some embodiments, the vehicle may be driven by an operator. In other embodiments, the vehicle may be an autonomous vehicle that is controlled by a vehicle motion management (VMM) unit configured to individually control vehicle units and/or vehicle axles and/or wheels of the vehicle. For ease of reference, the following description refers to vehicles in the form of heavy-duty vehicles, such as trucks.

One example of a system for handling surplus methane in a fuel supply system for an ICE system will now be described in relation to FIG. 1. FIG. 1 schematically illustrates a vehicle 1. The vehicle 1 comprises an ICE system 2. The ICE system 2 comprises an ICE 3, which is an ICE operable on LNG and/or CNG. The ICE 3 is thus configured to be operated based on LNG fuel or CNG fuel. An ICE configured to allow combustion of LNG or CNG can be provided in several different manners and are commonly known in the field of heavy-duty vehicles. Hence, the details of the ICE 3 will not be further described herein.

In addition, the vehicle 1 comprises a system 10 configured to handle surplus methane. The vehicle 1 also comprises a fuel supply system 8. The fuel supply system 8 is arranged and configured to supply fuel in the form of LNG or CNG to the ICE 3, as depicted in FIG. 1. In this example, the system 10 comprises the fuel supply system 8. A fuel supply system 8 for supplying LNG or CNG to an ICE may comprise several different components designed to store, transport, regulate, and deliver the fuel to the ICE 3. The specific components may vary depending on the type of natural gas (LNG or CNG), the ICE, and the application. FIG. 1 schematically illustrates one example of a fuel supply system for the ICE 3.

In FIG. 1, the fuel supply system 8 comprises at least one fuel conduit 18 for transporting LNG or CNG to the ICE 3. As both LNG and CNG are composed of methane, the fuel supply system 8 is configured to transport methane 11. As such, the fuel conduit 18 is configured to transport methane 11. It should be readily appreciated that the fuel conduit 18 is thus also configured to transport LNG fuel and CNG fuel, as these gases are composed of methane. The fuel supply system 8 is here an integral part of the ICE system 2. In other examples, the fuel supply system 8 is a separate part of the vehicle 1 that is connected to the ICE system 2. In general, the fuel conduit 18 is provided in the form or one or more fuel lines and piping. The fuel conduit 18 is configured to transport the methane (LNG or CNG fuel) from one or more storage tanks to the ICE 3.

Accordingly, the fuel supply system 8 here also comprises at least one fuel tank 7. The fuel tank 7 is configured to store and supply fuel to the ICE 3. Typically, the fuel supply system 8 comprises one or more fuel tanks 7, such as two fuel tanks 7, configured to store and supply fuel to the ICE.

In FIG. 1, the fuel supply system 8 is a liquid natural gas LNG fuel supply system. The fuel supply system may in other examples be a compressed natural gas CNG fuel supply system.

For LNG, the fuel tanks 7 may be cryogenic tanks designed to store LNG at extremely low temperatures. For CNG, the fuel tanks 7 may be high-pressure tanks that can store gas at pressures typically ranging from 3,000 to 3,600 psi (pounds per square inch).

The fuel supply system 8 may also include one or more pressure regulators (not shown) configured to reduce the pressure of the fuel to the required pressure for the ICE's operation.

As illustrated in FIG. 1, the system 10 also comprises an inert gas supply system 12. The inert gas supply system 12 is configured to be in fluid communication with the fuel supply system 8, The inert gas supply system 12 is also configured to supply inert gas 13 to the fuel supply system 8. More specifically, as illustrated in FIG. 1, the inert gas supply system 12 is configured to supply inert gas 13 to an inert gas supply conduit position 20 of the fuel supply system 8. The inert gas supply conduit position 20 interconnects the inert gas supply system 12 with the fuel conduit 18 of the fuel supply system 8. The inert gas supply conduit position 20 is thus the position of the fuel supply system 8 where inert gas 13 is injected into the fuel supply system 8.

In this example, as illustrated in FIG. 1, the inert gas supply system 12 comprises a tank 17 for storing inert gas 13. The tank 17 should be configured to store inert gas. Such tank is commonly known in the field of gas tanks, and thus not further described herein.

Moreover, the system 10 comprises a burner 14. The burner 14 is configured to be in fluid communication with the fuel supply system 8. The burner 14 can be provided in several different ways. The type of burner is generally selected depending on the application and requirements. The burner 14 is configured to burn methane. Some examples of suitable burners are natural gas burners, bunsen burners, industrial gas burners, boilers and the like.

Further, the system 10 comprises a controllable valve device 16. The controllable valve device 16 is disposed in the fuel conduit 18 at a valve fuel conduit position 22, as illustrated in FIG. 1. The valve fuel conduit position 22 is located downstream the inert gas supply conduit position 20, as illustrated in FIG. 1.

As also depicted in FIG. 1, the burner 14 is configured to be in fluid communication with the fuel supply system 8 via a controllable valve device 16. The controllable valve device 16 can be provided in several different manners. By way of example, the controllable valve device 16 is configured to control a pressurized gas, such as CNG, LNG and/or methane. One example of a controllable valve device is a solenoid valve. Solenoid valves are commonly used for controlling the flow of gases and liquids in various systems, and can also be used to direct methane effectively. One example of a solenoid valve is a 2-Way Normally Closed Solenoid Valve. A 2-way normally closed solenoid valve is designed to block the flow of gas when the valve is not energized (i.e., in its default state). When an electrical current is applied to the solenoid coil of the valve, it creates a magnetic field that lifts a plunger or armature, allowing gas to flow through the valve. This control allows for precise on/off operation. Other examples of controllable valves may likewise be suitable for incorporation in the fuel supply system 8.

In this example, the fuel supply system 8 comprises the controllable valve device 16. As illustrated in FIG. 1, the controllable valve device 16 is disposed downstream the inert gas supply conduit position 20. As such, the controllable valve device 16 is disposed at the valve fuel conduit position 22 which is downstream the inert gas supply conduit position 20 where inert gas 13 is injected into the fuel conduit 18. The controllable valve device 16 is thus arranged and configured to control the flow of methane from the fuel tank 7 to the ICE 3 and/or from the fuel tank 7 to the burner 14, as further described below.

As also illustrated in FIG. 1, the inert gas supply conduit position 20 fluidly connecting the inert gas supply system 12 to the fuel supply system 8 is located in-between the one or more fuel tanks 7 and the controllable valve device 16.

The term "fluidly connecting" typically means establishing a connection or relationship between elements or components in a manner that allows for a smooth and continuous flow of the gas, such as a flow inert gas, a flow of methane, and/or a flow of LNG/CNG.

The system 10 further comprises a controller 80, as depicted in FIG. 1. The controller 80 comprises processing circuitry 82. In FIG. 1, the controller 80 here also comprises a memory 84 and a system bus 86. In this example, the controller 80 is a computer system. These components and further optional technical details of the controller 80 provided in the form of a computer system are described in relation to FIG. 6.

Turning now to the operations of the controller 80. The processing circuitry 82 of FIG. 1 is configured to predict an upcoming ICE non-operational time period, and also configured to determine to inject inert gas 13 to the fuel supply conduit 18 via the inert gas supply conduit position 20 so as to flush the fuel supply system. The processing circuitry 82 is configured to configured to determine to inject inert gas 13 to the fuel supply conduit 18 in response to the predicted ICE non-operational time period. Moreover, the processing circuitry 82 is configured to control the controllable valve device 16 to direct any flushed-out methane to the burner 14. In this manner, any surplus methane that has been trapped in the fuel supply system 8 is allowed to be mixed with ambient air and burned into residuals by means of the burner 14. As such, the fuel supply system 8 can be emptied from surplus methane before the ICE 3 is turned into its non-operational state.

Figure 2:
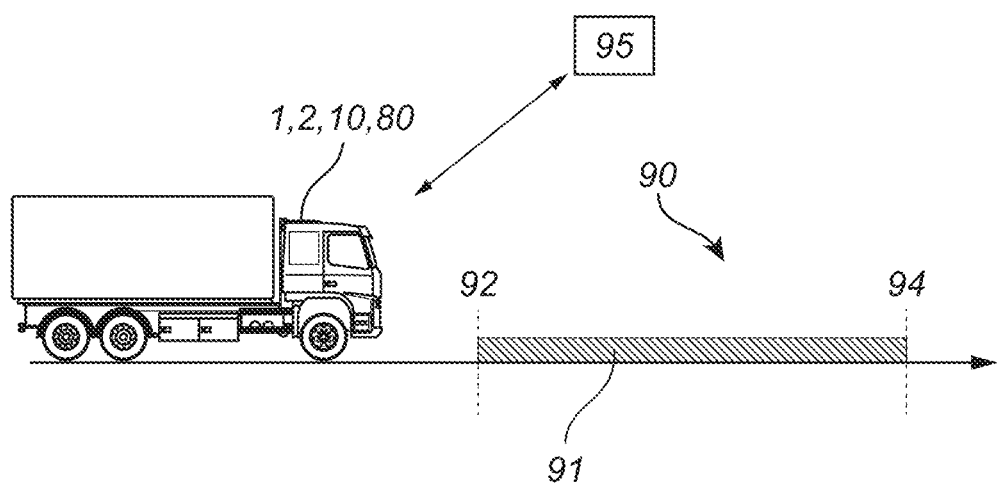
FIG. 2 illustrates an exemplary view of a situation when the system in FIG. 1 is controlled for handling surplus methane in a fuel supply system of a vehicle according to an example according to examples.

The operations of the controller 80 and the system 10 will now further be described in relation to FIG. 2, in combination with FIG. 1.

In FIG. 2, the vehicle 1 is approaching a road segment 91. Ahead of this route segment 91, the processing circuit 82 receives data indicative of a possibility of shutting down the ICE 3 during the road segment 91. In addition, the processing circuitry 82 receives data indicative of the route characteristics of the road segment 91. The route characteristics of the road segment 91 is used as input to determine whether or not it is suitable to set the ICE 3 into a non-operation state.

Based on data indicative of a possibility of shutting down the ICE 3 during the road segment 91, the processing circuitry 82 is able to determine an upcoming time period in which the ICE 3 will be set in a non-operational state.

The start of the time period 90 is indicated in FIG. 2 with reference 92. The start of the time period 90 here also corresponds to the start of the road segment 91. In a similar vein, the end of the time period 90 is indicated in FIG. 2 with reference 94. The end of the time period 90 here also corresponds to the end of the route segment 91.

More specifically, in FIG. 2 the processing circuitry 82 receives road characteristics ahead of approaching the road segment 91. By way of example, at the start position 92, the processing circuitry 82 receives an indication of the upcoming road segment 91 where it might be suitable to shutdown the ICE 3. Typically, the processing circuitry 82 is receives route information containing data indicating the starting point 92 and the end point 94 of the route segment 91, as illustrated in FIG. 2, thereby giving the travel distance. Based on the travel distance, and data indicative of prevailing and future vehicle speed and/or predicted vehicle speed, the processing circuitry 82 is configured to determine a possible, or suitable, ICE shut-down time period 90. Moreover, in this example, the route information comprises the road elevation profile of the route segment 91. It should be readily appreciated that the route information may comprise any or all of: speed limits, road type, road elevation profile, construction work, traffic flow, weather information or any other parameter that may influence the operation of the vehicle 1 and ICE system 2. Such data can be used in order to determine whether or not the ICE can, or should, be shutdown during the time period 90. The ICE shut-down time period 90 can be predicted at the start point 92, but may generally be determined (predicted) ahead of the road segment 91, and thus ahead of the start point 92, as depicted in FIG. 2.

The processing circuitry 82 may optionally also receive detailed traffic information from a remote server 95 comprising a corresponding processing circuitry configured to gather and transfer traffic information. In some examples, the processing circuitry 82 of the controller 80 receives data directly from a GPS receiver and/or a navigation system of the vehicle 1 so as to correlate a current location of the vehicle 1 with the information received from the remote server 95, for determining when (exactly) the road segment 91 is to be expected.

Based on the road characteristics, the processing circuitry 82 determines whether or not it would be suitable to shutdown the ICE 3 for a given time period, such as the upcoming time period between 92 and 94 in FIG. 2.

As such, the processing circuitry 82 predicts the upcoming ICE shut-down time period 90. In this example, the upcoming ICE shut-down time period 90 amounts to the time for operating the vehicle 1 along the road segment 91.

In this context, a shut-down of the ICE 3 refers to the process of turning off or stopping the ICE 3. Moreover, the process of shutting-down the ICE is generally a controlled and systematic process of turning off the ICE 3, as in a sequence of step, which is based on predictive data, as described herein.

The ICE shut-down time period 90 may vary for different vehicles and different road segments. By way of example, the processing circuitry 82 predicts that the ICE can be shut-down for a time period of 1 mins. Other time periods are also possible, such as 2, 3 or 5 mins. However, the time period may vary to a great extent for different situations and systems. Depending on leakage, the time can vary from a few seconds to an hour, or even more.

The upcoming ICE shut-down time period 90 is in one example a time period of a shutdown of the ICE 3 during stand-still of the vehicle 1. In another example, the upcoming ICE shut-down time period 90 is a time period of a shutdown of the ICE 3 while the vehicle eis moving along the route, as in FIG. 2.

The prediction of the ICE shut-down time period 90 as well as the operation of predicting the ICE 3 shut-down and the operation shutting down the ICE 3, are here integral parts of a so-called engine start-stop system. Engine start-stop systems automatically shut down the ICE 3 when the vehicle 1 comes to a complete stop, such as at traffic lights, and restart the ICE 3 when the driver presses the accelerator pedal. In addition, or alternatively, the prediction of the ICE shut-down time period 90 as well as the operation of predicting the ICE 3 shut-down and the operation of shutting down the ICE 3 is an integral part of a predictive engine start-stop (PESS) functionality. The predictive engine start-stop (PESS) functionality is configured to shutdown the ICE 3 in an automatically manner while the vehicle 1 is moving along the route, as in FIG. 2.

Hence, the ICE 3 can either be set to a non-operational state (including an inactive state, turned-off/shut-down state) during stand-still of the vehicle 1, or set to a non-operational state (including an inactive state, turned-off/shut-down state) while the vehicle 1 is moving along a road.

It should be noted that the above example with the ICE shut-down time period may also be applicable to situations where the ICE 3 is set to another type of non-operational state. Accordingly, in some examples, the processing circuitry 82 is configured to predict an upcoming ICE non-operational time period. The upcoming ICE non-operational time period may generally refer to a time period where the ICE is in a non-combustible state, i.e. a state in which the ICE is not combusting any fuel (LNG or CNG). This means that there may be a potential risk of having surplus methane in the fuel supply system. The non-combustible state may generally comprise an inactive state of the ICE including, but not restricted to, a non-load state, ICE shutdown state (where the ICE is turned off), a piston non-rotational state of the ICE and the like. In one example, the ICE non-operational time period is an ICE shut-down time period. As such, the processing circuitry 82 is configured to predict an upcoming ICE shut-down time period.

For ease of reference, the example in FIG. 2 illustrates an example of the system 10 while the vehicle 1 is moving on the road and where the ICE non-operational time period is an ICE shut-down time period.

Turning again to FIG. 2 in combination with FIG. 1, the processing circuitry 82 is configured to, in response to the predicted ICE shut-down time period 90, determine to inject inert gas 13 to the fuel supply conduit 18 via the inert gas supply conduit position 20 so as to flush the fuel supply system 8. In this, manner, injected inert gas 13 is supplied from the tank 17 of the inert gas system 12 and transported to the fuel supply conduit 18 of the fuel supply system 8. As illustrated in FIG. 1, the inert gas 13 is supplied from the tank 17 of the inert gas system 12 and transported to the fuel supply conduit 18 of the fuel supply system 8 at the position 20 downstream the fuel tank 7.

Further, the processing circuitry 82 is configured to control the controllable valve device 16 to direct any flushed-out methane to the burner 14, such that the methane 11 can be mixed with ambient air and burned into residuals such as $CO_2$ and water vapor. $CO_2$ and water vapor are here denoted as residuals as they are by-products from the combustion of LNG or CNG.

The $CO_2$ and water and/or water vapor may generally then be exhausted from the system 10 in a conventional way, e.g. via a venting conduit connect to the burner (although not illustrated).

The controllable valve device 16 is configured to direct any flushed-out methane to the burner 14 in response to a feed command from the processing circuitry 82. Also, as is apparent from the above, the controllable valve device 16 is configured to direct any flushed-out methane to the burner 14 in response to the predicted ICE shut-down time period 90.

In FIG. 1, the system 10 is configured to be activated in response to a change in an operational mode of the ICE 3. The change in the operational mode of the ICE 3 is e.g. a change from an active ICE state, in which the ICE 3 combusts fuel, to an ICE non-operational state, such as a shut-down mode or a non-load mode.

Optionally, although strictly not required, the processing circuitry 82 of the controller 80 is here further configured to compare the predicted ICE shut-down time period 90 with a threshold value. In addition, the processing circuitry 82 of the controller 80 is here further configured to determine to inject inert gas 13 to the fuel supply conduit 18 via the inert gas supply conduit position 20 so as to flush the fuel supply system 8 if the predicted ICE shut-down time period 90 exceeds the threshold value.

The threshold value is any one of a static threshold value and a dynamic threshold value. The threshold can be defined based on the gas leakage risk of the fuel supply system 8. By way of example, the threshold can be a time period associated with a maximum time period of ensuring a gaseous leak-proof fuel supply system 8. Hence, the threshold can be based on measurements on leak-proofness of the fuel supply system 8. By way of example, if the pressure is decreased in the fuel supply system after one or two hours, it may be useful to empty the fuel supply system from surplus methane after a few minutes in order to reduce the risk of methane leakage.

The dynamic threshold value is e.g. defined by a driver behavior prediction model configured to collect data of any one of a previous driver behavior and a previous usage of the vehicle. By way of example, the processing circuitry 82 is configured to predict that the vehicle 1 will stand-still for a predicted time period, e.g. corresponding to the ICE shut-down time period 90. In this situation, the processing circuitry 82 is configured to further predict that the vehicle 1 will be standing still for an excessive time period. This prediction can be performed by comparing the predicted time period with the time period of the threshold value, which can e.g. be defined by any one of the previous driver behavior and the previous usage of the vehicle. In response to this prediction of the excessive ICE shut-down time period, the processing circuitry 82 determines to flush the fuel supply system 8 from any surplus methane 11. The flushing of the fuel supply system 8 can also occur after the vehicle 1 has been standing still for a longer amount of time. The flushing of the fuel supply system 8 can also be enabled by the driver after the predicted ICE shut-down time period 90 has occurred.

Accordingly, the controller 80 initially receives data, such as road characteristics, so as to predict an upcoming ICE non-operational time period, in which the ICE 3 can be set e.g. in a shutdown state (i.e. not combusting fuel). Subsequently, the controller 80 compares the predicted upcoming ICE non-operational time period with the threshold, so as to determine whether or not there is a risk of methane leakage from the vehicle 1 (e.g. from the fuel supply system 8) during the upcoming ICE non-operational time period. The threshold is here a predetermined time period indicative of a potential risk of methane leakage. The threshold is e.g. a time period that is associated with methane leakage based on historical usage of the vehicle 1. If the upcoming ICE non-operational time period exceeds the threshold, the controller 80 determines that there is a risk of methane leakage during the shutdown of the ICE 3. Thus, when the ICE 3 is set into its non-operational state, e.g. the shutdown state, the controller 80 determines to inject inert gas 13 to the fuel supply conduit 18 via the inert gas supply conduit position 20 so as to flush the fuel supply system 8. As such, the controller 80, via the processing circuitry 82, determines to inject inert gas 13 to the fuel supply conduit 18 in response to the predicted ICE non-operational time period 90. Moreover, the controller 80 determines to control the controllable valve device 16 to direct any flushed-out methane 11 to the burner 14. At the burner 14, the methane 11 is burned into residuals, such as CO2 and water vapor. In this manner, any surplus methane 11 that has been trapped in the fuel supply system 8 is allowed to be directed away from the fuel conduit 18 and transported to the burner 14, e.g. in a conduit, so as to be mixed with ambient air received from the atmosphere, and subsequently burned into residuals by means of the burner 14. As such, the fuel supply system 8 can be emptied from surplus methane when the ICE 3 is turned into its non-operational state.

In this context, surplus methane generally refers to the amount of methane that remains in the fuel supply conduit 18. More specifically, surplus methane generally refers to the amount of pressurized methane trapped in the fuel conduit 18 connecting the fuel tank(s) 7 with the ICE 3. The methane will be trapped in the fuel conduit 18 since the ICE is, or will be, set in its inactive state, e.g. in the shutdown mode.

In FIG. 1, the system 10 here further comprises a sensor device 24 configured to monitor a pressure of the inert gas 13 stored in the inert gas supply system 12 so as to detect any leakage of the inert gas supply system 24.

It should also be readily appreciated that the fuel supply system 8 may include one or more sensors (not illustrated) configured to monitor leakage of methane from the fuel supply conduit 18.

The processing circuitry 82 of the controller 80 is here also configured to receive and gather the sensor leakage data as well as any other operating data of the vehicle 1 and the driver in order to control the handling of surplus methane 11 in the fuel supply system 8. As mentioned herein, the system 10 is an integral part of the vehicle 1. The system 10 can also be an integral part of the fuel supply system 8. In other examples, the system 10 may at least partly be a part of another sub-system of the vehicle 1 and partly a part of the fuel supply system 8.

By the above configuration of the processing circuitry 82 to predict the upcoming engine shut-off time period 90; determine to inject inert gas 13 to the fuel supply conduit 18 in response to the predicted engine shut-off time period 90; and control the controllable valve device 16 to direct any flushed-out methane to the burner 14, such that the methane can be mixed with ambient air and burned into CO2 and water vapor, the system 10 provides a more efficient fuel supply system for an ICE operating on LNG and CNG, in which trapped methane can be more safely taken care of by burning-off the methane trapped on the fuel side of the ICE 3.

Figure 3:
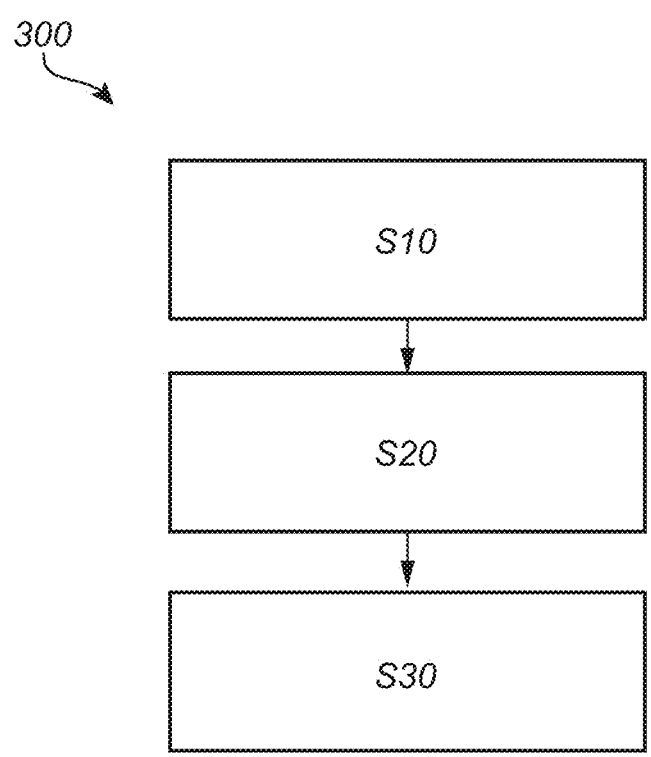
FIG. 3 is a flow chart of an exemplary method to control the system according to an example.

FIG. 3 is a flow chart of a method according to an example. More specifically FIG. 3 is an exemplary computer implemented method according to an example. The computer-implemented method 300 is intended for handling surplus methane 11 in the fuel supply system 8 for the ICE system 2. The fuel supply system 8 may be an integral part of the system 10. The system further comprises the inert gas supply system 12 configured to be in fluid communication with the fuel supply system 8 and further configured to supply inert gas 13 to the inert gas supply conduit position 20 of the fuel supply system 8. The system 10 also comprises the burner 14 configured to be in fluid communication with the fuel supply system 8 via the controllable valve device 16. The controllable valve device 16 is disposed downstream the inert gas supply conduit position 20. The steps of the method 300 are here implemented by the processing circuitry 82.

As illustrated, the computer-implemented method 300 comprises a step of predicting S10 an upcoming ICE shut-down time period 90.

Further, the computer-implemented method 300 comprises a step of determining S20 to inject inert gas 13 to the fuel supply conduit 18 via the inert gas supply conduit position 20 so as to flush the fuel supply system 8, in response to the predicted ICE shut-down time period 90.

Next, the computer-implemented method 300 comprises a step of controlling S30 the controllable valve device 16 to direct any flushed-out methane to the burner 14, such that the methane 11 can be mixed with ambient air and burned into residuals, such as CO2 and water vapor.

Figure 5:
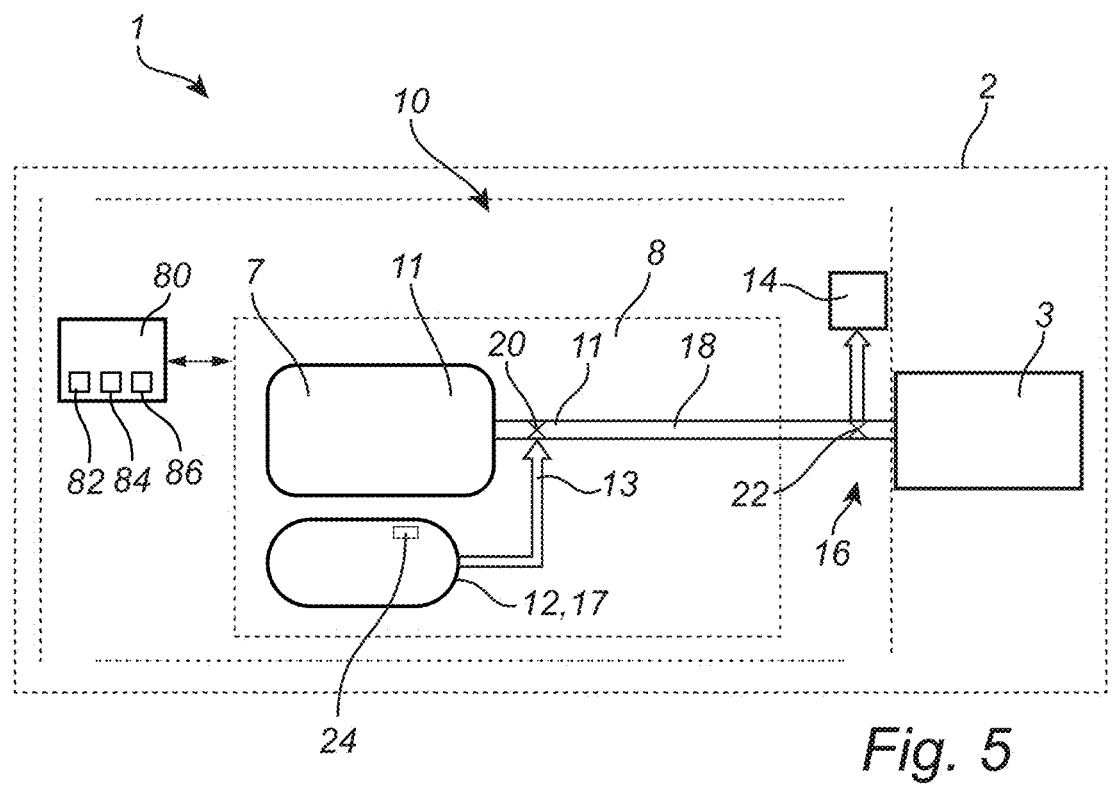
FIG. 5 illustrates another exemplary view of a system for handling surplus methane in a fuel supply system of a vehicle according to an example.

FIG. 5 schematically illustrates another example of a system 10 for handling surplus methane 11 in a fuel supply system 8 for an ICE system 2.

As illustrated in FIG. 5, the system 10 comprises the fuel supply system 8, the inert gas supply system 12 configured to be in fluid communication with the fuel supply system 8 and further configured to supply inert gas 13 to the inert gas supply conduit position 20 of the fuel supply system 8. The system 10 also comprises the burner 14 configured to be in fluid communication with the fuel supply system 8 via the controllable valve device 16. The controllable valve device 16 is disposed downstream the inert gas supply conduit position 20. Moreover, the system 10 comprises the controller 80 having the processing circuitry 82. The processing circuitry 82 is configured to predict the upcoming ICE shut-down time period; in response to the predicted ICE shut-down time period, determine to inject inert gas 13 to the inert gas supply conduit position 20 of the fuel supply conduit 18 so as to flush the fuel supply system; and control the controllable valve device 16 to direct any flushed-out methane to the burner 14, allowing the methane to be be mixed with ambient air and burned into residuals, such as CO2 and water vapor.

There is also provided a computer program product comprising program code for performing, when executed by the processing circuitry 82, the method 300.

There is further provided a non-transitory computer-readable storage medium comprising instructions, which when executed by the processing circuitry 82, cause the processing circuitry 82 to perform the method 300.

Further details of one example of a computer system that can be used as the controller 80 will now be described in relation to FIG. 4.

Figure 4:
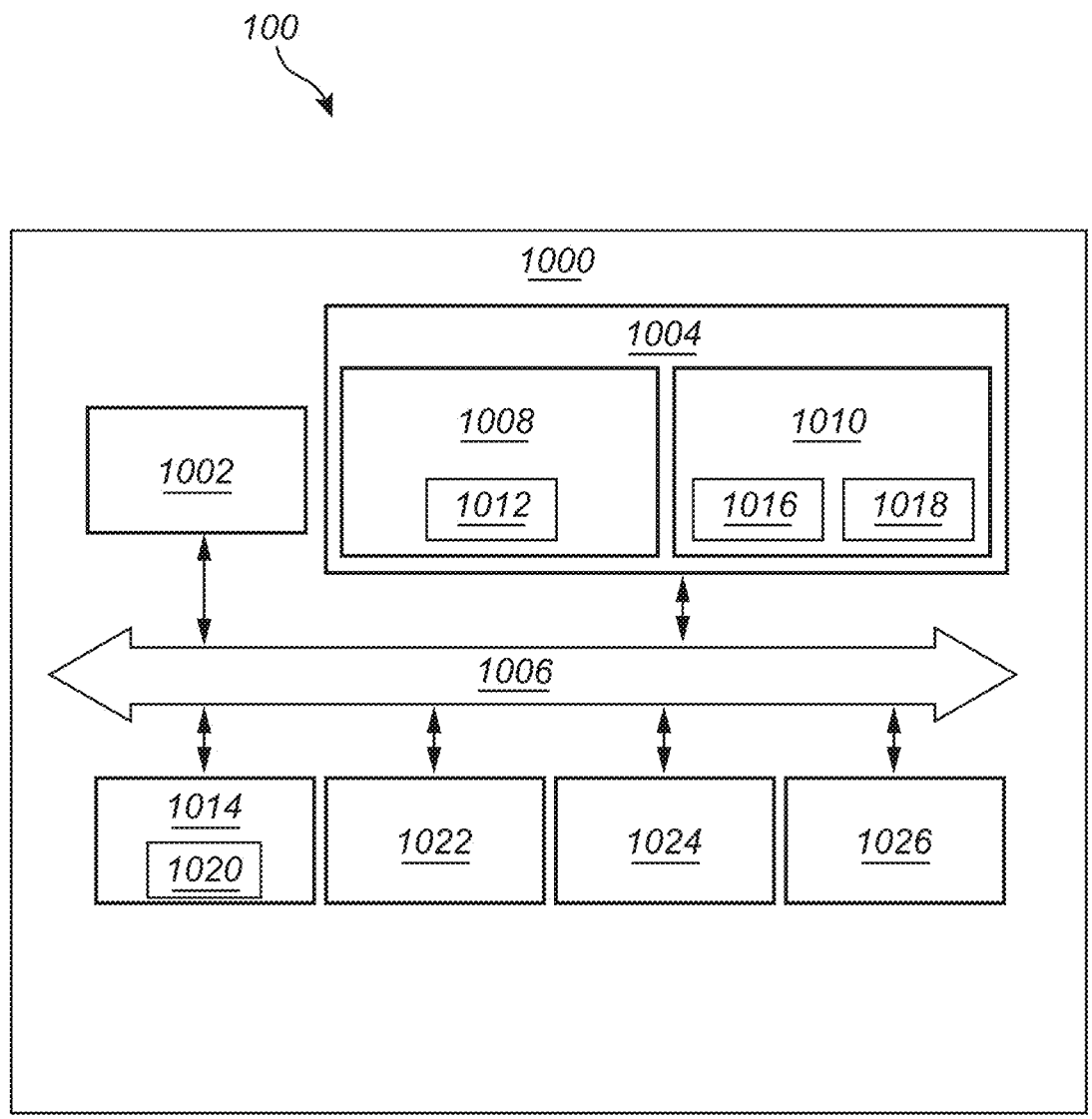
FIG. 4 is a schematic diagram of an exemplary computer system for implementing examples disclosed herein, according to an example.

FIG. 4 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1

A system 10 for handling surplus methane 11 in a fuel supply system 8 for an internal combustion engine ICE system 2, the system comprising: an inert gas supply system 12 configured to be in fluid communication with the fuel supply system and further configured to supply inert gas 13 to an inert gas supply conduit position 20 of the fuel supply system; a burner 14 configured to be in fluid communication with the fuel supply system via a controllable valve device 16, the controllable valve device being disposed downstream the inert gas supply conduit position; and a controller 80 comprising processing circuitry 82 configured to: predict an upcoming ICE non-operational time period 90; in response to the predicted ICE non-operational time period, determine to inject inert gas to the inert gas supply conduit position so as to flush the fuel supply system; and control the controllable valve device to direct any flushed-out methane to the burner, allowing the methane to be mixed with ambient air and burned into residuals.

Example 2

System according to example 1, wherein the system is configured to be activated in response to a change in an operational mode of the ICE.

Example 3

System according to example 1 or example 2, wherein the fuel supply system comprises one or more fuel tanks 7 configured to store and supply fuel to the ICE.

Example 4

System according to examples 1 to 3, wherein the fuel supply system is a liquid natural gas LNG fuel supply system or a compressed natural gas CNG fuel supply system.

Example 5

System according to examples 3 or 4, wherein the inert gas supply conduit position fluidly connecting the inert gas supply system to the fuel supply system is located in-between the one or more fuel tanks and the controllable valve device.

Example 6

System according to examples 1 to 5, wherein the inert gas supply system comprises a tank 17 for storing inert gas.

Example 7

System according to examples 1 to 6, wherein the controller is further configured to compare the predicted ICE non-operational time period with a threshold value, and determine to inject inert gas to the fuel supply conduit via the inert gas supply conduit position so as to flush the fuel supply system if the predicted ICE non-operational time period exceeds the threshold value.

Example 8

System according to example 7, wherein the threshold value is any one of a static threshold value and a dynamic threshold value.

Example 9

System according to example 8, wherein the dynamic threshold value is defined by a driver behavior prediction model configured to collect data of any one of previous driver behavior and previous usage of the vehicle.

Example 10

System according to examples 1 to 9, further comprising a sensor device to monitor a pressure of the inert gas stored in the inert gas supply system so as to detect any leakage of the inert gas supply system.

Example 11

System according to any one of examples 1 to 10, wherein the ICE non-operational time period is an ICE shut-down time period.

Example 12

A vehicle comprising a system according to examples 1 to 11.

Example 13

A computer-implemented method 300 for handling surplus methane 11 in a fuel supply system 8 for an internal combustion engine ICE system 2, the system comprising an inert gas supply system 12 configured to be in fluid communication with the fuel supply system and further configured to supply inert gas 13 to the inert gas supply conduit position 20 of the fuel supply system; a burner 14 configured to be in fluid communication with the fuel supply system via a controllable valve device 16, the controllable valve device being disposed downstream the inert gas supply conduit position; the computer-implemented method comprising: predicting S10, by processing circuitry of a computer system, an upcoming ICE non-operational time period 90; in response to the predicted ICE non-operational time period, determining S20, by processing circuitry of a computer system, to inject inert gas to the inert gas supply conduit position 20 so as to flush the fuel supply system 8; and controlling S40, by processing circuitry of a computer system, the controllable valve device to direct any flushed-out methane to the burner, allowing the methane to be mixed with ambient air and burned into residuals.

Example 14

A computer program product comprising program code for performing, when executed by the processing circuitry of any of examples 1-11, the method of example 13.

Example 15

A non-transitory computer-readable storage medium comprising instructions, which when executed by the processing circuitry of any of examples 1-11, cause the processing circuitry to perform the method of example 13.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A system for handling surplus methane in a fuel supply system for an internal combustion engine (ICE) system, wherein the system comprises:
   an inert gas supply system configured to be in fluid communication with the fuel supply system and further configured to supply inert gas to an inert gas supply conduit position of the fuel supply system;
   a burner configured to be in fluid communication with the fuel supply system via a controllable valve device, the controllable valve device being disposed downstream the inert gas supply conduit position; and
   a controller comprising processing circuitry configured to:
   predict an upcoming ICE non-operational time period;
   in response to the predicted ICE non-operational time period, determine to inject inert gas to the inert gas supply conduit position so as to flush the fuel supply system; and
   control the controllable valve device to direct any flushed-out methane to the burner, allowing the methane to be mixed with ambient air and burned into residuals.

2. The system according to claim 1, wherein the system is configured to be activated in response to a change in an operational mode of the ICE.

3. The system according to claim 1, wherein the fuel supply system comprises one or more fuel tanks configured to store and supply fuel to the ICE.

4. The system according to claim 1, wherein the fuel supply system is a liquid natural gas (LNG) fuel supply system or a compressed natural gas (CNG) fuel supply system.

5. The system according to claim 3, wherein the inert gas supply conduit position fluidly connecting the inert gas supply system to the fuel supply system is located in-between the one or more fuel tanks and the controllable valve device.

6. The system according to claim 1, wherein the inert gas supply system comprises a tank for storing inert gas.

7. The system according to claim 1, wherein the controller is further configured to compare the predicted ICE non-operational time period with a threshold value, and determine to inject inert gas to the fuel supply conduit via the inert gas supply conduit position so as to flush the fuel supply system if the predicted ICE non-operational time period exceeds the threshold value.

8. The system according to claim 7, wherein the threshold value is any one of a static threshold value and a dynamic threshold value.

9. The system according to claim 8, wherein the dynamic threshold value is defined by a driver behavior prediction model configured to collect data of any one of previous driver behavior and previous usage of a vehicle.

10. The system according to claim 1, further comprising a sensor device to monitor a pressure of the inert gas stored in the inert gas supply system so as to detect any leakage of the inert gas supply system.

11. The system according to claim 1, wherein the ICE non-operational time period is an ICE shut-down time period.

12. A vehicle comprising the system of claim 1.

13. A computer-implemented method for handling surplus methane in a fuel supply system for an internal combustion engine (ICE) system, the system comprising an inert gas supply system configured to be in fluid communication with the fuel supply system and further configured to supply inert gas to an inert gas supply conduit position of the fuel supply system; a burner configured to be in fluid communication with the fuel supply system via a controllable valve device, the controllable valve device being disposed downstream the inert gas supply conduit position; the computer-implemented method comprising:

predicting, by processing circuitry of a computer system, an upcoming ICE non-operational time period;

in response to the predicted ICE non-operational time period, determining, by processing circuitry of a computer system, to inject inert gas to the inert gas supply conduit position so as to flush the fuel supply system; and controlling, by processing circuitry of a computer system, the controllable valve device to direct any flushed-out methane to the burner, allowing the methane to be mixed with ambient air and burned into residuals.

14. A computer program product comprising program code for performing, when executed by processing circuitry, the method of claim 13.

15. A non-transitory computer-readable storage medium comprising instructions, which when executed by processing circuitry, cause the processing circuitry to perform the method of claim 13.

* * * * *